May 16, 1933.  C. J. COBERLY  1,909,660
METHOD OF PRODUCING DIVERGENT WALL SLOTS IN METAL
Filed April 15, 1930

INVENTOR.
Clarence J. Coberly
By
ATTORNEY.

Patented May 16, 1933

1,909,660

UNITED STATES PATENT OFFICE

CLARENCE J. COBERLY, OF LOS ANGELES, CALIFORNIA, ASSIGNOR TO KOBE, INC., OF HUNTINGTON PARK, CALIFORNIA, A CORPORATION OF CALIFORNIA

METHOD OF PRODUCING DIVERGENT WALL SLOTS IN METAL

Application filed April 15, 1930. Serial No. 444,494.

My invention relates to cutting diverging wall-slots by use of a jet of cutting gas such as oxygen, and relates particularly to the cutting of such slots in metal plates whereby to form filter strainers or well screen therefrom.

In the manufacture of well screen by cutting slots in pipe, or seamless steel tubing, a jet, or jets of oxygen are employed. It is essential that the walls of the slots in well screen diverge inwardy so that a desired clearance will be obtained. To produce such diverging wall slots in the practice of cutting by use of oxygen, cutting torch tips having a plurality of oxygen jets are extensively employed.

My present invention comprehends a method and apparatus whereby a single jet of oxygen is caused to diverge as it issues from the cutting torch tip, thereby making it possible to cut a diverging wall slot therewith.

It is an object of the invention to provide a new method of producing divergence in a jet of cutting gas, or oxygen, by rotating the flow of cutting gas on its axis, such rotation producing divergence of the cutting jet.

A further object of the invention is to provide a simple means for producing rotation of a flow, or a jet of gas on its axis whereby to cause divergence thereof.

Further objects and advantages of the invention will appear throughout the following part of the specification.

Referring to the drawing which is for illustrative purposes only,

Figure 1:
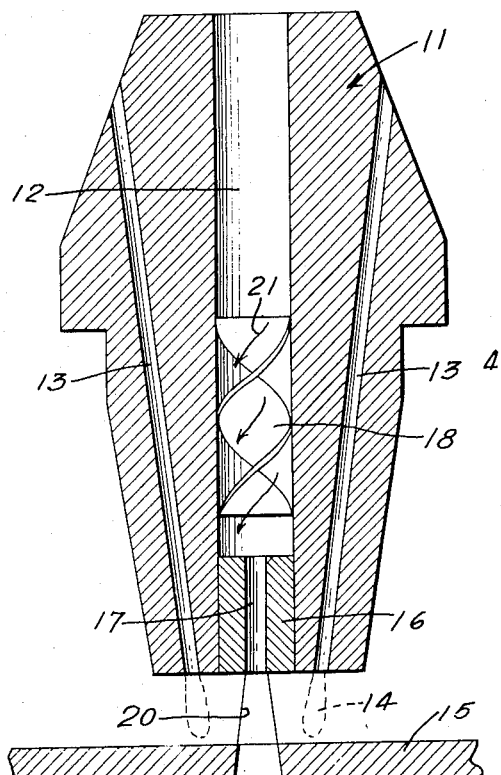
Fig. 1 is an enlarged vertical section through a cutting torch tip embodying my invention and a portion of a plate having a slot cut therein by use of a cutting torch tip.

In the form of my invention disclosed in Fig. 1, 11 represents the torch tip body having a central gas passage 12 therein and a plurality of passages 13 disposed in circular arrangement around the central gas passage 12, these passages 13 having the purpose of carrying a combustible gas mixture, such as a mixture of acetylene gas and oxygen for producing pre-heating flames 14 which are directed against a metal plate 15 prior to and for the purpose of initiating the cutting action. A bushing 16 is inserted in the lower end of the tip body 11 and has an axial discharge opening 17 therein which constitutes the lower, diametrically reduced end of the gas passage 12.

In the gas passage 12 above the reduced portion 17 thereof I place means 18 for producing rotation in the flow of gas which passes through the gas passage 12 and issues in the form of a cutting jet 20 which diverges in the manner shown by reason of its rotation on its axis. The means 18 for imparting rotation to the flow of gas may be made in the form of a strip of metal bent in the form of a spiral or screw substantially as shown. The flow of gas downwardly through the gas passage 12 is caused to rotate in a manner indicated by arrows 21. The rotating gas is constrained by the walls of the gas passage 12 and when it issues from the mouth of the gas passage, the centrifugal action thereof causes it to expand and diverge in the manner shown.

Figure 2:
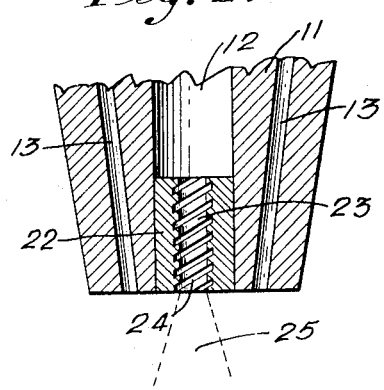
Fig. 2 is a fragmentary vertically sectioned view, showing the lower portion of a cutting torch tip with an alternative form of my invention.

In Fig. 2 I show a bushing 22 set into the lower end of the gas passage 12 of the torch tip body 11, this bushing having an axial passage 23, the walls of which are rifled by the forming of helical grooves 24 therein. This rifling of the passage 23 produces axial rotation of the flow of gas and consequent divergence of the gas which issues from the torch tip in the form of a cutting jet 25.

An inspection of the forms of the invention shown in Figures 1 and 2 makes it clearly evident that a number of equivalent means may be employed to accomplish rotation of the flow of cutting gas whereby to accomplish the desired results.

In Figures 1 and 2 I have shown means for producing rotation of a flow of cutting gas through and from a cutting torch tip by means of walls so formed as to impart a rotary motion to the gas.

Figure 3:
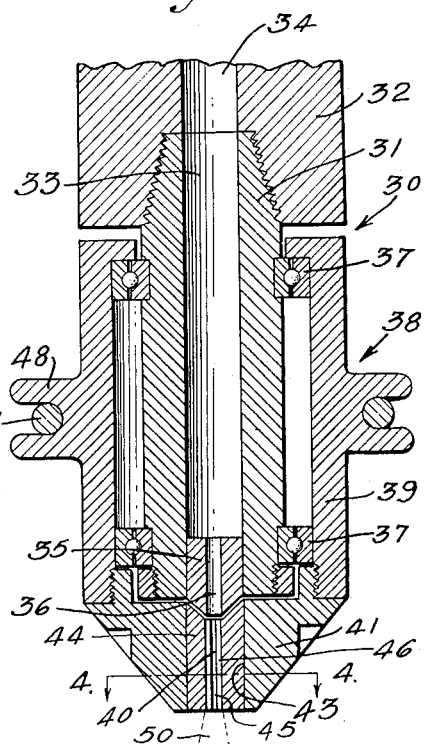
Fig. 3 is a vertically sectioned view showing an additional torch tip structure by which the invention may be produced.
Figure 4:
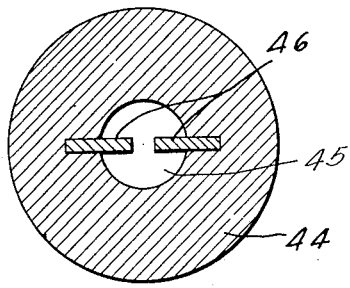
Fig. 4 is an enlarged cross section through the outlet bushing of the torch tip structure shown in Fig. 3, this section being taken on a plane represented by the line 4—4 of Fig. 3.

In Figures 3 and 4 I show a cutting torch tip structure 30 by which the flow of cutting gas is rotated in response to rotation of the walls of the passage through which the gas flows.

In Fig. 3, which is essentially of diagrammatic character I show a central barrel 31, projecting downwardly from a torch head 32 and having a gas passage 33 therein connecting with a gas passage 34 in the head 32. The lower end of the passage 33 may be diametrically reduced by inserting in the lower end of the barrel 31 a bushing 35 having an opening, or passage, 36 therethrough. By means of ball bearings 37 which are held in spaced relationship on the barrel 31 a rotary member 38 is held. This rotary member consists essentially of a cylindrical portion 39 which surrounds the ball bearings 37 and a head portion 41, which is secured in the lower end of the cylindrical portion 39 and extends across the lower end of the barrel 31. In the axial bore 43 of the head 41 of the rotary member 38 is a bushing 44 having a gas passage 45 therethrough axially aligned with the passage 36 of the stationary bushing 35 situated in the lower end of the barrel 31. Projecting into the passage 45 are vertical vanes or plates 46 which are more clearly shown in the enlarged sectional view Fig. 4. A belt 47 is extended from a power means over a shieve or pulley 48 formed upon the exterior of the rotary member 38 and operates to rotate the rotary member at a relatively high rate of speed. The vanes 46, being secured to and forming a part of the rotary member 38 rotate therewith and impart rotation to the cutting gas which flows through the passage 33 and the passage 45, issuing from the lower end of the bushing 44 in a diverging jet 50, the divergence of which is produced as the result of rotation of the issuing flow of gas.

In each of the devices disclosed, my method of producing divergence of a cutting jet by imparting rotation to the gas forming such cutting jet is represented. It is recognized that various parts or elements may be employed to accomplish substantially identical results in a substantially equivalent manner, therefore it is to be understood that my invention is not limited by the details of this disclosure but should be accorded the full scope of the following claims.

I claim as my invention:

1. A method of the character described, for producing an expanding jet of cutting gas, comprising: passing a flow of gas through a passage and a discharge orifice; and rotating said flow of gas prior to its entry into said orifice, so as to rotate the flow of gas within and issuing from said orifice.

2. A method of the character described, for producing an expanding jet of cutting gas, comprising: passing a flow of gas through a passage and a discharge orifice; and imparting rotation to said flow of gas within said orifice so that said flow of gas will be in rotation upon issuing from said orifice.

3. A method of the character described, for producing an expanding jet of cutting gas, comprising: passing a flow of gas through a passage; and rotating said flow of gas on its axis by rotating the walls of said passage on a longitudinal axis lying within said passage.

4. A method of the character described, for producing an expanding jet of cutting gas, comprising: passing a flow of gas through a passage; and rotating said flow of gas on its axis by rotating the walls of said passage on the axis of said flow of gas.

5. A method of the character described, for producing an expanding jet of cutting gas, comprising: passing a flow of gas through a passage and a discharge orifice; and rotating said flow of gas by rotating the walls of said orifice on its axis while said flow of gas is passing therethrough.

6. A method of the character described, for producing an expanding jet of cutting gas, comprising: passing a flow of gas through a passage and a discharge orifice of non-circular cross section; and rotating said flow of gas by rotating the walls of said orifice on its axis while said flow of gas is passing therethrough.

7. A method of cutting in metal a slot having divergent walls, the method including the steps of: passing a stream of cutting gas through a passage; centrifugating said stream of cutting gas in said passage; releasing said centrifugating stream of cutting gas, thus producing a divergent-wall cutting jet; and passing said divergent-wall cutting jet through the metal to be cut.

8. A method of cutting in metal a slot having divergent walls, the method including the steps of: rotating a stream of cutting gas in a confined space; releasing said rotating stream of cutting gas so that same may expand to form a divergent-wall cutting jet; and passing said divergent-wall cutting jet through the metal to be cut.

9. A method of cutting in metal a slot having divergent walls, the method including the steps of: passing a stream of cutting gas through a passage; rotating said stream of cutting gas near the point where said stream of cutting gas is released from said passage to produce a divergent-wall cutting jet; and passing said divergent-wall cutting jet through the metal to be cut.

10. A method of cutting in metal a slot having divergent walls, the method including the steps of: heating the metal to be cut;

and passing therethrough a rotating divergent-wall jet of cutting gas.

11. A method of cutting in metal a slot having divergent walls, the method including the steps of: heating the metal to be slotted; rotating a stream of cutting gas to produce a divergent-wall cutting jet; and passing said divergent-wall cutting jet through said heated metal.

In testimony whereof, I have hereunto set my hand at Los Angeles, California this 10th day of April, 1930.

CLARENCE J. COBERLY.